United States Patent [19]

Pinch et al.

[11] 4,010,312

[45] Mar. 1, 1977

[54] HIGH RESISTANCE CERMET FILM AND METHOD OF MAKING THE SAME

[75] Inventors: Harry Louis Pinch; Benjamin Abeles, both of Princeton; Jonathan Isaac Gittleman, Trenton, all of N.J.

[73] Assignee: RCA Corporation, New York, N.Y.

[22] Filed: Jan. 23, 1975

[21] Appl. No.: 543,629

[52] U.S. Cl. .............................. 428/450; 428/433; 428/469; 204/192; 427/101; 427/123; 427/126

[51] Int. Cl.² ........................ B32B 9/06; B32B 3/06

[58] Field of Search .................. 428/450, 469, 433; 427/101, 123, 126, 102, 103; 29/620; 252/512, 513, 515

[56] References Cited

UNITED STATES PATENTS

| | | | |
|---|---|---|---|
| 3,200,010 | 8/1965 | Place | 428/450 |
| 3,326,645 | 6/1967 | Counts et al. | 427/123 |
| 3,326,720 | 6/1967 | Bruhl et al. | 428/450 |
| 3,329,526 | 7/1967 | Daily et al. | 427/101 |
| 3,416,960 | 12/1968 | Kelly et al. | 427/101 |
| 3,669,724 | 6/1972 | Brand | 428/450 |

FOREIGN PATENTS OR APPLICATIONS

| | | |
|---|---|---|
| 2,017,367 | 10/1971 | Germany |

*Primary Examiner*—George F. Lesmes
*Assistant Examiner*—W. R. Dixon, Jr.
*Attorney, Agent, or Firm*—Glenn H. Bruestle; Carl L. Silverman

[57] ABSTRACT

A cermet film includes metal particles in an insulator with the metal particles having an average diameter of from about 30A to about 120A. The cermet film has a high resistivity, and low temperature coefficient of resistivity, and is stable under electric fields of up to $10^5$volts/cm. The cermet film can be formed by co-sputtering the metal and the insulator onto a substrate. The sputtered cermet film is then annealed in a reducing atmosphere whereby its resistivity is increased without a corresponding change in its temperature coefficient of resistivity.

15 Claims, 7 Drawing Figures

HIGH RESISTANCE CERMET FILM AND METHOD OF MAKING THE SAME

BACKGROUND OF THE INVENTION

The present invention relates to a cermet film, and particularly to such a cermet film having a high resistivity and a low temperature coefficient of resistivity so as to be useful as a resistor. The cermet film also exhibits high electric field and high temperature stability.

Cermets are well-known mixtures of ceramic and metal particles. When a ceramic, or insulator, and a metal are cosputtered, the resultant cermet film may consist of very small metal granules in an insulating matrix, i.e., metal particles having an average diameter of less then 200A. Cermets have found extensive use as resistors in microelectronic devices, integrated semiconductor circuits and in hybrid thick film circuits. The use of cermet materials permits one skilled in the art to obtain a particular resistivity merely by choosing the proper kind and quantity of ingredients, i.e., ceramic and metal.

For some applications a high resistance, relatively low temperature coefficient of resistivity (TCR) film would be useful. For example, insulating substrates coated with cermet films would make excellent chip resistors for thick film hybrid circuits. High sheet resistivity could then be obtained without the need for mechanical, chemical or laser trimming of long meander paths. Furthermore, for some applications, it may be necessary that the resistive films function at temperatures of 250° to 300° C and under dc fields of up to 30,000 volts/cm.

SUMMARY OF THE INVENTION

A high resistance cermet film is on a substrate. The cermet film is composed of a metal and an insulator. The film has a metal percent volume no greater than the metal percent volume at which the percolation threshold appears. The cermet film having been annealed in a reducing atmosphere.

DETAILED DESCRIPTION OF THE INVENTION

Figure 1:
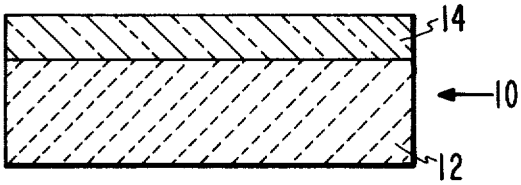
FIG. 1 is a cross-sectional view of a resistor which includes a high resistance cermet film produced in accordance with the present invention.

Referring initially to FIG. 1, one form of a resistor of the present invention is generally designated as 10. The resistor 10 of the present invention comprises a refractory substrate 12 upon which is a high resistance cermet film 14. Suitable substrate materials are those which conform to the requirements imposed by the various process stages and the intended operation of the high resistance cermet film. The substrate 12 is preferably of a material which is able to withstand temperatures as high as 1000° C. Refractory materials such as ceramics, quartz, and high melting point materials, e.g., aluminum oxide, meet these requirements.

The high resistance cermet film 14 is composed of a metal and an insulator in which the metal content is preferably less than about 50 per cent by volume. Suitable metals include, for example, tungsten, molybdenum, cobalt, and nickel. Generally, suitable metals include any metal whose oxide can be reduced to the metal under the conditions of annealing. Suitable insulators include inorganic materials such as aluminum oxide, silicon dioxide, zirconium oxide, and yttrium oxide. Generally, the insulators include any stable oxide that won't become conductive after annealing, i.e., heating. As will be described, the cermet film 14 must be annealed in order to achieve the desired properties.

Figure 2:
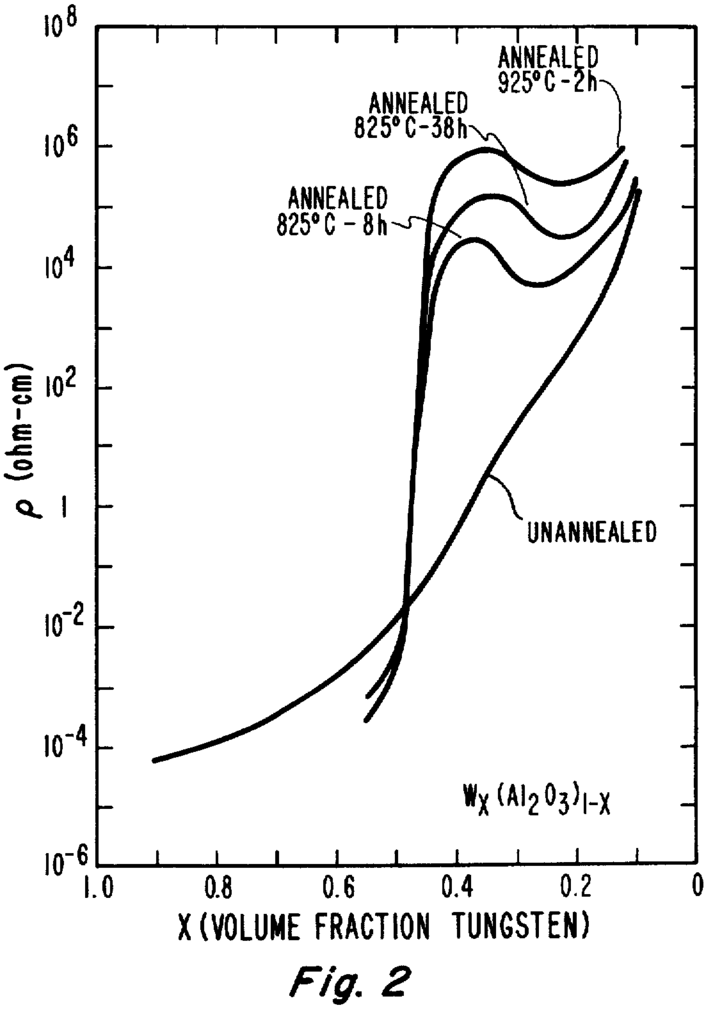
FIG. 2 is a graph showing resistivity ($\rho$) of a tungsten-aluminum oxide cermet film of the present invention as a function of the volume fraction ($x$) of tungsten before and after annealing for the indicated temperature and time.
Figure 3:
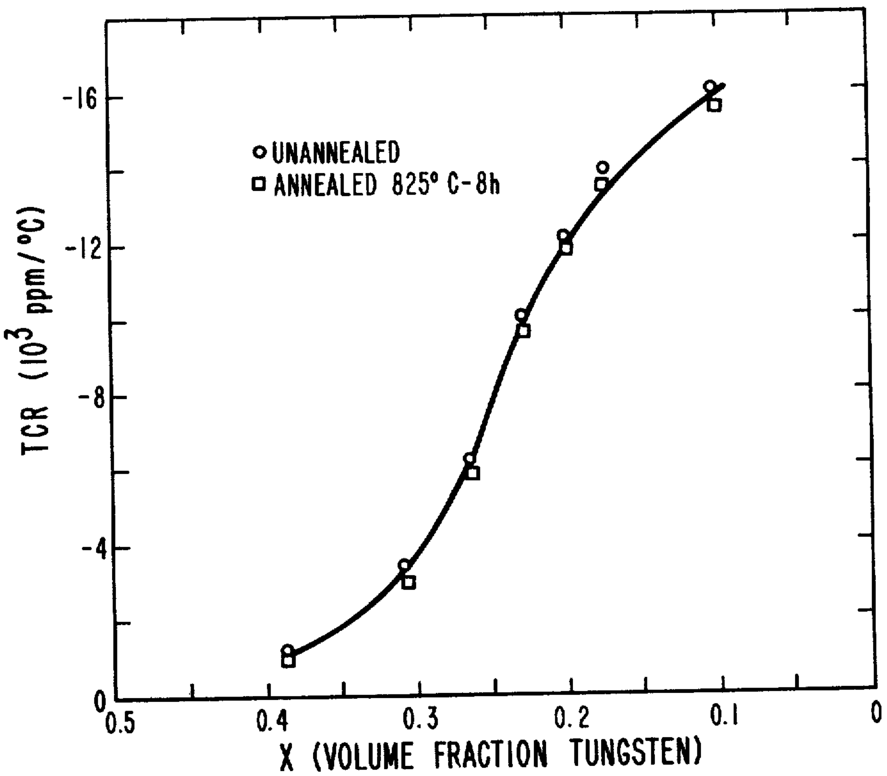
FIG. 3 is a graph showing the temperature coefficient of resistivity (TCR) at room temperature of a tungsten-aluminum oxide cermet film of the present invention as a function of the volume fraction ($x$) of tungsten prior to being annealed and after being annealed.
Figure 4:
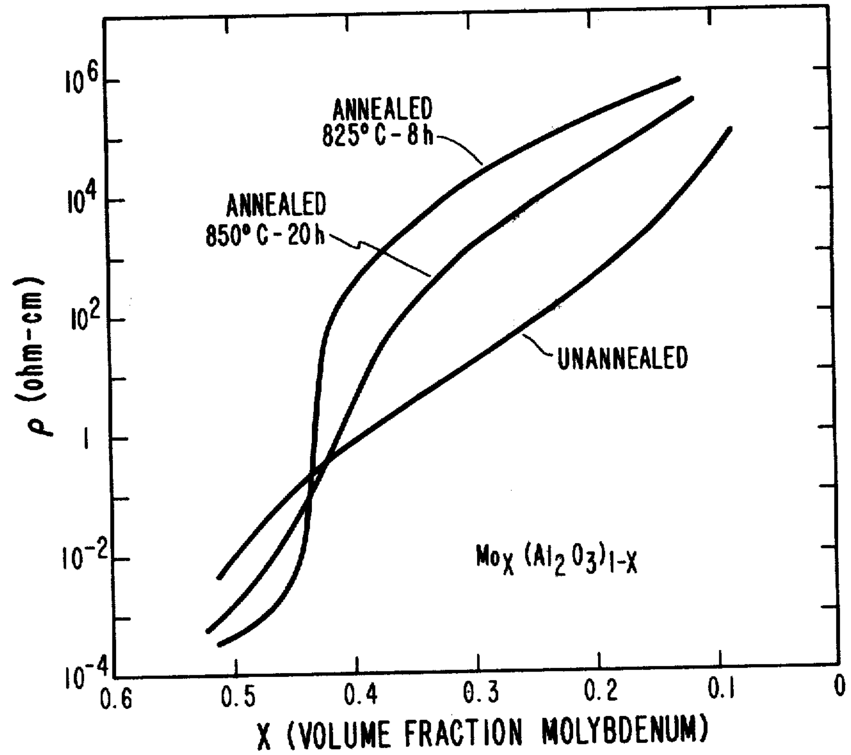
FIG. 4 is a graph showing resistivity ($\rho$) of a molybdenum-aluminum oxide cermet film of the present invention as a function of the volume fraction ($x$) of molybdenum before and after annealing for the indicated temperature and time.
Figure 5:
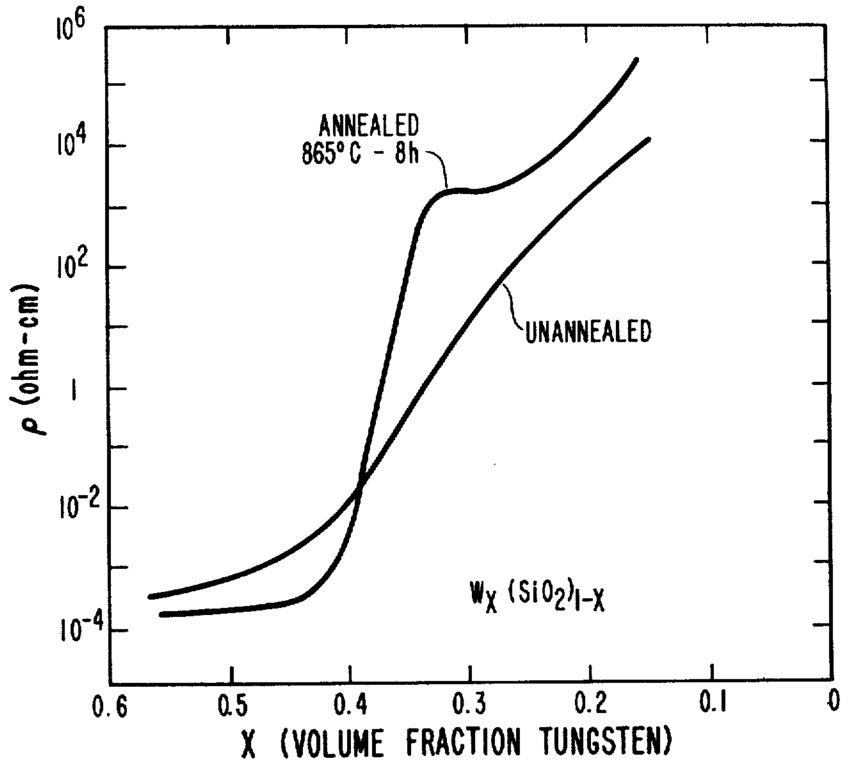
FIG. 5 is a graph showing resistivity ($\rho$) of a tungsten-silicon dioxide cermet film of the present invention as a function of the volume fraction ($x$) of tungsten before and after annealing for the indicated temperature and time.

An annelaed $W_x(Al_2O_3)_{1-x}$ cermet film of the present invention, where $x$=volume fraction of tungsten, can have a high resistivity ($\rho$), i.e., up to approximately $10^7$ ohm-cm, as shown in FIG. 2. The annealed $W_x(Al_2O_3)_{1-x}$ cermet film unexpectedly exhibits substantially the same temperature coeffficient of resistivity (TCR) i.e., as low as −1000 ppm/° C, as the unannealed film, as shown in FIG. 3. Other annealed cermet compositions of the present invention exhibit similar properties, e.g., $Mo_x(Al_2O_3)_{1-x}$ and $W_x(SiO_2)_{1-x}$, as shown in FIGS. 4 and 5, respectively.

In addition to exhibiting high resistivity ($\rho$) and low temperature coefficient of resistivity (TCR), the cermet films of the present invention also exhibit temperature stability, i.e., to at least 300° C. Furthermore, the annealed cermet films of the present invention have been found to be stable to the presence of electric fields of up to $10^6$V/cm as shown in Table I below.

Table I

| | Tungsten-Aluminum Oxide Cermet Films (x = 0.20 vol fraction tungsten) | | | |
|---|---|---|---|---|
| Time (min) | Volts (kV) | Current (μA) | Resistance (ohms) | Power (m Watts) |
| 0 | 20 | 2.2 | $0.91 \times 10^{10}$ | 44 |
| 10 | 20 | 2.4 | $0.83 \times 10^{10}$ | 48 |
| 20 | 20 | 2.4 | $0.83 \times 10^{10}$ | 48 |
| 40 | 20 | 2.4 | $0.83 \times 10^{10}$ | 48 |
| 50 | 20 | 2.4 | $0.83 \times 10^{10}$ | 48 |

Figure 6:
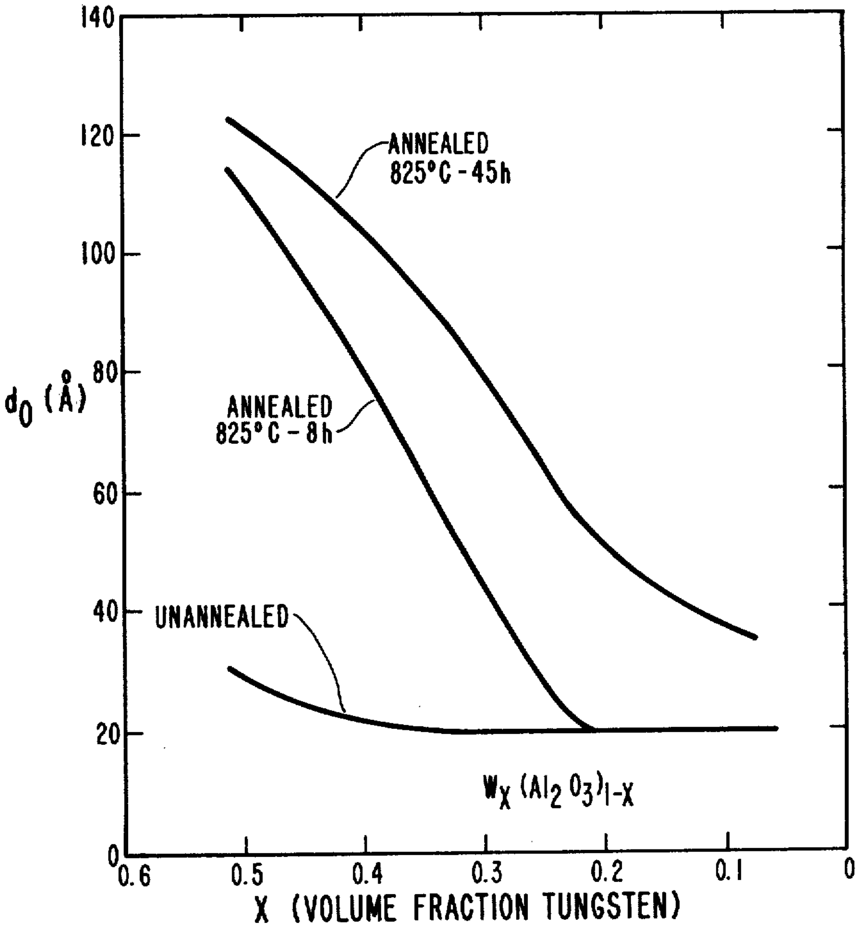
FIG. 6 is a graph showing the average tungsten particle diameter $d_o$ as a function of the volume fraction ($x$) of tungsten in a tungsten-aluminum oxide cermet of the present invention before and after annealing for the indicated temperature and time.

X-ray measurements show that the high resistivity, low temperature coefficients of resistivity cermet films of the present invention, e.g., $W_x(Al_2O_3)_{1-x}$, consist of small isotropic crystalline tungsten particles and amorphous aluminum oxide, i.e., a granular film. The average diameter of the particles was determined from the widths of the diffraction lines, as is well known in the art. It was found that the annealed cermet films of the present invention which exhibit high resistivity and low temperature coefficient of resistivity are films which include metal particles having an average diameter $d_o$ of from about 30A to about 120A, as shown in FIG. 6 in which the average particle diameter $d_o$ of tungsten particles is shown as a function of the composition of a $W_x(Al_2 0_3)_{1-x}$ cermet. We believe the x-ray measurements indicate that the increase in resistance of such a tungsten-aluminum oxide film due to annealing can be attributed to the grain growth of the tungsten particles.

In the fabrication of the high resistivity, low temperature coefficient of resistivity cermet films of the present invention, the substrate 12 selected is initially cleansed by means of any conventional cleaning techniques, the choice of a particular cleansing agent being dependent upon the composition of the substrate itself. Thereafter, the substrate is placed in a sputtering apparatus suitable for the deposition of the desired cermet film. The conditions used in sputtering as employed herein are known. By employing a proper voltage, pressure and spacing of the various elements within the vacuum chamber, a cermet film of a desired composition can be deposited upon the substrate, e.g., a tungsten-aluminum oxide cermet film onto an aluminum oxide substrate. As will be explained, it is desirable to maintain low background pressure of gaseous impurities in the sputtering system so as to reproducibly and consistantly produce films having the desired properties.

Specifically, the high resistance cermet film of the present invention can be obtained, for example, by co-sputtering from a tungsten-aluminum oxide target onto an aluminum oxide substrate. The films can be prepared by radio frequency (rf) sputtering at an argon pressure of about $5 \times 10^{-3}$ torr in a conventional diode sputtering system. The sputtering target can consist of a large diameter tungsten disk upon which an aluminum oxide disk with an evenly spaced array of holes is located (not shown). The cermet film composition can be varied, as is well known in the art, for example, by using different diameter holes thereby changing the relative area fraction of aluminum oxide to tungsten. The composition of the sputtered cermet film can be determined from the sputtering rates of tungsten and aluminum oxide, and from electron beam microprobe measurements and chemcial analysis, as is known in the art.

Figure 7:
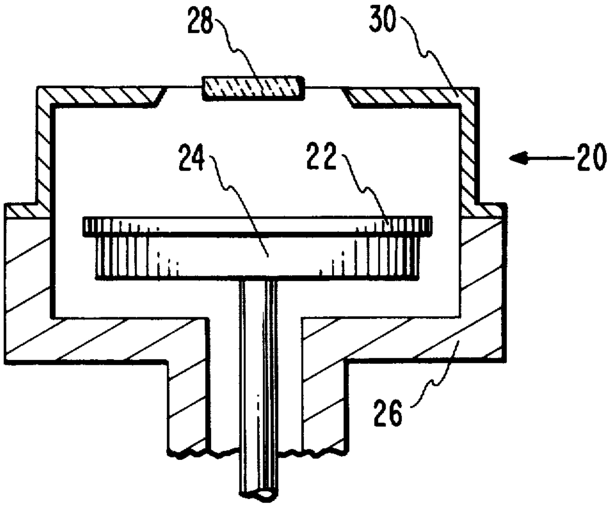
FIG. 7 is a cross-sectional view of a portion of a conventional sputtering system in which a plasma confining enclosure is disposed around the target so as to be useful in forming the cermet film of the present invention.

It is essential in the sputtering step in the preparation of the cermet films of the present invention to maintain low background pressure of gaseous impurities, e.g., $O_2$, $CO_2$, $H_2O$, and other condensable or reactive gases, so as to produce films with the desired properties. The low background pressure can be obtained by fitting a plasma confining enclosure around the substrate and target so that getter sputtering occurs as shown in FIG. 7 in which a portion 20 of a conventional sputtering system is shown. The portion 20 of the sputtering system includes a target 22, a water-cooled cathode 24 and a cathode shield 26. A water-cooled substrate 28 is disposed in spaced relation to the target 22. The portion 20 of the sputtering system includes a plasma confining enclosure 30 which is conducive to getter sputtering which is known to reduce the gaseous impurities in deposited films.

In addition to the use of the plasma confining enclosure 30 of FIG. 7, it is also preferable that the sputtering system be pumped to initial pressures of less than $1 \times 10^{-7}$ torr before the inert gas, e.g., argon, is admitted. Also it is desirable to have efficient substrate cooling during the sputtering, e.g., water cooling, so that the deposited film is not heated by the plasma. Furthermore, it is desirable to have a liquid nitrogen or similarly cooled trap to remove gaseous impurites during deposition, i.e., a Meissner trap, near the region of sputtering.

The cermet films are then removed from the sputtering system and annealed in a reducing atmosphere. For example, annealed in hydrogen at temperatures in excess of about 750° C, preferably for time periods in excess of 1 hour. It is essential that the films be annealed in a reducing atmosphere, e.g., in the presence of hydrogen, as can be observed in Table II below in which one part of a tungsten-aluminum oxide cermet film having a volume fraction ($x$) of tungsten of 0.30 was annealed in dry hydrogen at 850° C for 6 hours and another part of the film was annealed in vacuum, i.e., $p = 6 \times 10^{-8}$ tr, also at 850° C for 6 hours.

Table II

| Annealing Method | Initial Resistivity (ohm-cm) | Final Resistivity (ohm-cm) |
|---|---|---|
| Dry Hydrogen | $2.07 \times 10^1$ | $7.45 \times 10^4$ |
| Vacuum | $1.93 \times 10^1$ | $1.47 \times 10^1$ |

Following the sputtering step, the sputtered cermet film exhibits a conventional resistivity ($\rho$) and temperature coefficient of resistivity (TCR). For example, a cermet film having a volume fraction ($x$) of tungsten of approximately 0.30, i.e., 30 per cent by volume, exhibits a resistivity ($\rho$) of approximately 20 ohm-cm as shown in FIG. 2. The same cermet film exhibits a temperature coefficient of resistivity (TCR) of approximately –4,000 ppm/° C as shown in FIG. 3. It has been observed that when such a cermet film is subsequently annealed in accordance with the present invention its resistivity is substantially increased, e.g., by up to a factor of $10^8$ wherein the resistivity ($\rho$) changes from approximately $10^{-1}$ ohm-cm to approximately $10^7$ ohm-cm as shown in FIG. 2 for films having a volume fraction ($x$) of tungsten within the range of from about 0.45 to about 0.25. Thus, at any given cermet composition having a volume fraction ($x$) of tungsten less than about 0.46, an upward controlled adjustment of resistivity is possible through a suitable choice of the temperature and time of anneal, as shown in FIG. 2.

Of great importance for various device applications of cermet films has been the unexpected result that the temperature coefficient of resistivity (TCR) of the cermet film of the present invention is substantially invariant with respect to the annealing process. After annealing it has been discovered that the temperature coefficient of resistivity (TCR) of the cermet film of the present invention is substantially the same as its initial value as shown in FIG. 3. Thus, as shown in FIGS. 2 and 3, the resistivity ($\rho$) of cermet films of various compositions can be increased through an annealing step without any significant corresponding change in the temperature coefficient of resistivity (TCR). It is believed that within the range of interest for this invention the temperature coefficient of resistivity (TCR) of the cermet of the present invention is a function of the cermet composition only.

It is presently believed that the unexpected properties of the cermets of the present invention involves the presence of the classical percolation threshold in the cermet composition. The percolation threshold is defined as the cermet composition at which it first appears that substantially no continuous conduction channels exist, i.e., most of the metal grains do not touch each other, so that the resistivity increases sharply. Thus, at the percolation threshold, and at metal contents less than that at which the percolation threshold appears, tunneling of electrons is the only conduction process. We have found, for example, that be annealing granular $W_x(Al_2O_3)_{1-x}$ films in hydrogen at temperatures in excess of 750° C, an abrupt percolation threshold appears near $x \cong 0.46$, as can be observed from FIG. 2.

The x-ray results, indicate that the appearance of the resistivity edge for $W_x(Al_2O_3)_{1-x}$ with annealing is due to grain growth. The decrease in resistivity with annealing for $x > 0.46$ is attributed to an increase of the electron mean free path in the meal continum while the increase in resistivity for $x < 0.46$ is attributed to the decrease in the number density of the W grains. The sharp resistivity edge indicates a classical percolation threshold at $x \cong 0.46$. Such a percolation threshold has been predicted for a mixture of insulating and conducting phases by R. Landouer in *J. Appl. Phys.*, 23, 779 (1952) and by some of the more recent three dimensional percolation theories, e.g., V.K.S. Shante and Scott Kirkpatrick, *Advances in Physics*, 20, 325 (1971). The maxima and minima in the resistivity of the annealed films in the curve of FIG. 2 indicate that the annealing rate is most rapid in the vicinity of $x \cong 0.46$. This is to be expected since the particles in the vicinity of this composition touch or nearly touch and grain growth occurs by particle coalescence.

The percolation threshold for the molybdenum-aluminum oxide cermet occurs at a volume fraction of $x \cong 0.44$, as shown in FIG. 4, which is less than the corresponding value for the tungsten-aluminum oxide cermet film shown in FIG. 2. The percolation threshold for the tungsten-silicon dioxide cermet occurs at a volume fraction of $x \cong 0.39$, as shown in FIG. 5. However, the important consideration is that all these systems exhibit the conduction percolation threshold at a particular composition. The large increase in resistance upon annealing occurs in all these systems at metal concentrations which are no greater than the percolation threshold concentration.

It should be noted that although cermet films of the present invention were described with tungsten or molybdenum metal and aluminum oxide and/or silicon dioxide insulators, many substitutions can be made for both the metal and the insulator. Thus, there is provided by the present invention a high resistance cermet film which also exhibits a low temperature coefficient of resistivity. In addition, the high resistance cermet film exhibits high electric field and high temperature stability.

We claim:

1. An article of manufacture comprising a high resistance cermet film on a refractory substrate, said cermet film being composed of a metal and a refractory insulator, said metal being selected from the group consisting of molybdenum, tungsten, cobalt and nickel, said metal being in the form of particles having an average diameter of from about 30 A to about 120 A, said film having a metal percent volume of less than about 50 per cent, said cermet film having been annealed in a reducing atmosphere wherein the resistivity of said cermet film is increased without an increase in the temperature coefficient of resistivity.

2. An article of manufacture in accordance with claim 1 in which said cermet film has been annealed in the presence of hydrogen.

3. An article of manufacture in accordance with claim 2 in which said cermet film has been annealed at a temperature in excess of about 750° C.

4. An article of manufacture in accordance with claim 1 in which said cermet film is obtained through cosputtering said metal and said insulator onto said substrate.

5. An article of manufacture in accordance with claim 1 in which said metal comprises tungsten.

6. An article of manufacture in accordance with claim 5 in which said insulator comprises aluminum oxide.

7. An article of manufacture in accordance with claim 6 with said tungsten content in the range of from about 46 to about 25 percent volume.

8. An article of manufacture in accordance with claim 5 in which said insulator comprises silicon dioxide.

9. An article of manufacture in accordance with claim 1 in which said metal comprises molybdenum.

10. An article of manufacture in accordance with claim 9 in which said insulator comprises aluminum oxide.

11. An article of manufacture in accordance with claim 1 in which said cermet film has a resistivity in the range of from about $10^{-2}$ ohm-cm to about $10^6$ ohm-cm.

12. An article of manufacture in accordance with claim 11 in which said cermet film has a resistivity in the range of from about $10^2$ ohm-cm to about $10^6$ ohm-cm.

13. An article of manufacture comprising a cermet film on a refractory substrate, said cermet film having a resistivity of from about $10^3$ ohm-cm to about $10^6$ ohm-cm, said cermet film being composed of a metal, said metal being in the form of particles having an average diamenter of from about 40 A to about 110 A, and a refractory insulator, said metal being selected from the group consisting of molybdenum, tungsten, cobalt and nickel, said film having a metal percent volume of from about 30 to about 40 percent.

14. An article of manufacture in accordance with claim 13 having a temperature coefficient of resistivity of from about 1200 to about 3000 ppm/C°.

15. An article of manufacture in accordance with claim 13 in which said metal comprises tungsten.

* * * * *